US010919350B2

(12) United States Patent
Hall et al.

(10) Patent No.: US 10,919,350 B2
(45) Date of Patent: Feb. 16, 2021

(54) SYSTEM FOR OPTIMIZING A TRAILER PATH

(71) Applicant: HALL LABS LLC, Provo, UT (US)

(72) Inventors: David R. Hall, Provo, UT (US);
Michael Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 30 days.

(21) Appl. No.: 16/240,707

(22) Filed: Jan. 4, 2019

(65) Prior Publication Data

US 2019/0202251 A1 Jul. 4, 2019

Related U.S. Application Data

(60) Provisional application No. 62/613,610, filed on Jan. 4, 2018.

(51) Int. Cl.
| | |
|---|---|
| *B60D 1/30* | (2006.01) |
| *B60W 20/10* | (2016.01) |
| *B60W 10/20* | (2006.01) |
| *B60W 10/04* | (2006.01) |
| *B60D 1/62* | (2006.01) |
| *B60D 1/24* | (2006.01) |

(52) U.S. Cl.
CPC .............. *B60D 1/30* (2013.01); *B60D 1/245* (2013.01); *B60D 1/62* (2013.01); *B60W 10/04* (2013.01); *B60W 10/20* (2013.01); *B60W 20/10* (2013.01); *B60W 2300/14* (2013.01); *B60W 2420/42* (2013.01); *B60W 2520/105* (2013.01); *B60W 2520/125* (2013.01)

(58) Field of Classification Search
None
See application file for complete search history.

(56) References Cited

U.S. PATENT DOCUMENTS

| | | | | |
|---|---|---|---|---|
| 10,604,184 | B2 * | 3/2020 | Mattern | B62D 15/025 |
| 2017/0073003 | A1 * | 3/2017 | Shepard | B62D 13/06 |
| 2017/0297620 | A1 * | 10/2017 | Lavoie | B62D 5/04 |
| 2018/0121742 | A1 * | 5/2018 | Son | G06K 9/00791 |
| 2019/0061817 | A1 * | 2/2019 | Mattern | B62D 15/025 |
| 2019/0347498 | A1 * | 11/2019 | Herman | G08G 1/162 |
| 2020/0039487 | A1 * | 2/2020 | Prabhakar | B60T 7/20 |

* cited by examiner

*Primary Examiner* — Peter D Nolan
*Assistant Examiner* — Demetra R Smith-Stewart (57) ABSTRACT

The invention is a system for optimizing a trailer path. The system includes an image sensor configured to capture images of a trailer attached to a tow vehicle, accelerometers that sense acceleration of at least one of the tow vehicle and the trailer, a data input device configured to receive input data, and a processing device. The processing device includes a processor and non-volatile memory. The processor is configured to receive image data from the image sensor, receive accelerometer data from the one or more accelerometers and receive the input data from the data input device. Additionally, the processor is configured to determine a trailer path based on the image data, accelerometer data, and the input data. The processor is also configured to communicate the trailer path to a user or vehicle control system, thereby prompting adjustments to the tow vehicle path and or acceleration when the trailer path is not optimum.

19 Claims, 7 Drawing Sheets

SYSTEM FOR OPTIMIZING A TRAILER PATH

CROSS-REFERENCE TO RELATED APPLICATIONS

The present application is a continuation-in-part of U.S. Provisional Application No. 62/613,610, filed Jan. 4, 2018, entitled "Trailer Length Determination (TLD)". The entire disclosures of this prior applications are incorporated by reference.

TECHNICAL FIELD

This invention generally relates to systems that optimize a trailer path.

BACKGROUND

The act of backing up a vehicle with an attached trailer can be a challenging maneuver even for individuals with considerable driving experience. Such maneuvers often require counterintuitive inputs, making them error-prone, cumbersome, frustrating, and dangerous, especially for inexperienced drivers. A common mistake when backing up a vehicle and trailer is to "jack knife" or "bind" the vehicle and trailer during the reverse motion. When this occurs, the driver is prevented from being able to steer the vehicle and trailer any further along its desired path. Backup maneuvers are particularly difficult with long wheelbase dual-axle trailers (as compared to single axle trailers), thus leaving the driver even more prone to jack knifing or binding.

The length of the trailer influences the process of backing up. Short trailers are more sensitive to changes in the angle or pitch of the trailer with respect to the tow vehicle and can jack knife very quickly if care is not taken to make necessary adjustments while steering the vehicle.

In addition to potential problems while backing up a trailer, even the forward motion of a vehicle towing a trailer may present possible hazards. Towing a trailer of unknown length and weight may cause a condition known as off-tracking. Due to their size and weight, vehicles pulling trailers are challenging to operate safely in traffic. Off-tracking may cause drivers of a vehicle towing a trailer difficulty in negotiating turns. Off-tracking is when the rear wheels of the trailer travel in a different path around turns and curves than the front wheels do, an effect that frequently results in accidents. Because this is a known effect, truck wreck attorneys maintain that it is the truck driver's responsibility to prevent accidents through careful driving and negotiation of turns.

Off-tracking is when a Longer Combination Vehicle (LCV) like a tractor trailer makes a turn or negotiates a ramp, and the rear wheels of the trailer end up driving in a different path than the tractor and the front wheels of the trailer. This happens in conditions where there is not enough space for the driver to make a wide turn that prevents off-tracking, such as turning on city streets or tight highway on ramp curves. Trailers that off-track usually run over curbs when turning to the right and invade oncoming traffic lanes when turning to the left. Also, in these tighter situations, the longer the trailer, or combination of trailers, the greater the amount of off-tracking.

Off-tracking is a common cause of accidents that range from minor to severe. The usual way that these occurrences happen is when trucks end up driving into other vehicles in their path, or sometimes even unsuspecting pedestrians. At slow speeds such as negotiating city streets this effect is known to cause many fender-bender type accidents, but when off-tracking happens at higher speeds, such as when negotiating a tight curve in the road or an on- or off-ramp, cars can be sideswiped by a truck's rear wheels, and a bigger, more dangerous accident can occur as a result.

Although it is impossible for truck drivers to avoid off-tracking in many situations, especially when negotiating tight city streets, there are specific, and safe ways in which off-tracking should be handled. Most importantly, drivers must drive slowly enough to carefully make their turns, stopping if it seems they will run into other vehicles, pedestrians or objects along the side of the road. It is the duty of the truck driver to yield to other traffic when it becomes obvious that the truck cannot make its turn without driving into the path of oncoming cars, or onto the sidewalk, and give those vehicles and people the chance to move out of the way. Careless driving and truck drivers who are moving too fast in close conditions are generally the cause of these kinds of accidents.

When trucks fail to stop, or drivers try to stop too late, they may end up hitting something or someone. Drivers of any vehicle, not just big trucks, who are in a hurry tend to make poor judgment decisions, such as those that lead to off-tracking accidents. For this reason, most off-tracking accidents are found to be the fault of truck drivers.

While off-tracking may not be avoidable in some instances, especially with longer trucks, or multi-trailer LCVs, knowing the appropriate way to deal with it is essential. When truck drivers are careless, tractor trailer accidents caused by off-tracking happen and people are injured.

In order to properly maneuver a trailer being towed, it is important to know the length of the trailer. Determining the limits for hitch angle (position of trailer with respect to the tow vehicle) is necessary to determine the extent of off-tracking, and to prevent jack knifing.

The length of the trailer must be known in order to properly determine allowable hitch angles. Jackknifing during backing up of trailers occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time and can potentially cause damage or personal injury.

Therefore, a system is needed to determine the optimum path for a trailer being pulled by a tow vehicle. The system should communicate this optimum path to a user or driver so that adjustments may be made to the tow vehicle's path in order to achieve the desired optimum trailer path. In the case of an autonomous or Advanced Driver Assisted (ADA) vehicle, the optimum trailer and tow vehicle path should be communicated to the vehicle control system.

SUMMARY

In one aspect, the invention is a system for optimizing a trailer path. The system includes an image sensor configured to capture images of a trailer attached to a tow vehicle, accelerometers that sense acceleration of at least one of the tow vehicle and the trailer, a data input device configured to receive input data, and a processing device. The processing device includes a processor and non-volatile memory. The processor is configured to receive image data from the image sensor, receive accelerometer data from the one or more accelerometers and receive the input data from the data input device. Additionally, the processor is configured to determine a trailer path based on the image data, accelerometer data, and the input data. The processor is also configured to communicate the trailer path to a user or vehicle control system, thereby prompting adjustments to the tow vehicle path and or acceleration when the trailer path is not optimum. The acceleration may be positive or negative (deceleration when braking, for example).

In a preferred embodiment, the system may utilize tractrix involute curves to describe the motion of the tow vehicle and trailer to predict future trailer path and vehicle path. The system may also include sensors on the tow vehicle and trailer. The image sensors may be mounted on the back of the tow vehicle or on the rear-view mirrors. The system may further determine length and width of the trailer. The system may also include a monitoring device that sends the image data, the accelerometer data, and the input data to a monitoring system and to a vehicle control system of either standard or hybrid vehicles. The system may communicate via a wireless interface. The system may further build a model of a set-up for a specific tow vehicle connected to a specific trailer. The system may also include a cloud-based network for monitoring, control and system back-up. The data input device may be a cell phone or mobile device. The system may further monitor the behavior of a tow vehicle and trailer for a specific trip, make adjustments to the model and store the adjusted model in memory.

Features and advantages of different embodiments of the invention will become more fully apparent from the following description and appended claims or may be learned by practice of the invention as set forth hereinafter.

Consistent with the foregoing, a system for optimizing a trailer path is disclosed. The objectives of the system are to determine a trailer path based on the image data, accelerometer data, and the input data and communicate the trailer path to a user or vehicle control system, thereby prompting adjustments to the tow vehicle path and or acceleration when the trailer path is not optimum. The system may utilize tractrix involute curves to describe the motion of the tow vehicle and trailer to predict future trailer path and vehicle path. The system may also include sensors on the tow vehicle and trailer. The image sensors may be mounted on the back of the tow vehicle or on the rear-view mirrors. The system may further determine length and width of the trailer. The system may also include a monitoring device that sends the image data, the accelerometer data, and the input data to a monitoring system and to a vehicle control system of either standard or hybrid vehicles. The system may communicate via a wireless interface. The system may further build a model of a set-up for a specific tow vehicle connected to a specific trailer. The system may also include a cloud-based network for monitoring, control and system back-up. The data input device may be a cell phone or mobile device. The system may further monitor the behavior of a tow vehicle and trailer for a specific trip, make adjustments to the model and store the adjusted model in memory.

In a preferred embodiment, a system for optimizing a trailer path may include at least one image sensor configured to capture images of a trailer attached to a tow vehicle, one or more accelerometers that sense acceleration of the tow vehicle and/or the trailer, a data input device configured to receive input data, and a processing device. The processing device may include a processor and non-volatile memory. The processor may be configured to receive image data from the image sensor, receive accelerometer data from the one or more accelerometers, receive input data from the data input device. The processor may further determine a trailer path based on the image data, accelerometer data, and the input data and communicate the trailer path to a user or vehicle control system, thereby prompting adjustments to the tow vehicle path and or acceleration when the trailer path is not optimum.

In an embodiment, tractrix involute curves may be utilized to predict behavior data for the tow vehicle attached to the trailer. The behavior data may include data describing motion of the tow vehicle, motion of the trailer, motion of the trailer with respect to the tow vehicle, trailer path and vehicle path. The processor may also be configured to predict a future vehicle path and a future trailer path based on the behavior data.

In certain embodiments, the input device may also include one or more sensors. The one or more sensors produce sensor data. The image sensors may be mounted on the back of the tow vehicle, on the sides of the tow vehicle, and/or on the rear-view mirrors of the tow vehicle. The processor may also determine length and width of the trailer.

In one embodiment, the system may include a monitoring device that communicates the image data, the accelerometer data, and the input data to a monitoring system. The monitoring device may communicate the image data, the accelerometer data, and the input data to the vehicle control system. The system may send at least one control command to the vehicle control system, controlling the operation of a tow vehicle based on the determined vehicle path. The system may send at least one control command to a hybrid vehicle control system, controlling the operation of a hybrid tow vehicle's electric motor and internal combustion engine based on the determined vehicle path.

In another embodiment, the input device may be an OBD device connected by a plug-in connector to a vehicle OBD port. The system may send at least one control command to a vehicle computer server.

In a certain embodiment, the input device may receive and transmit data via a wireless interface. The wireless interface may utilize a protocol of at least one of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

In an embodiment, the processor may be configured to build a model of a set-up for a specific tow vehicle connected to a specific trailer. The model may determine at least one mode based on the data associated with the set-up for the model. The model may then be stored in the non-volatile memory. The system may also receive user settings and communicate the user settings for the model to the vehicle control system. The system may also alert the user to the settings for the model. The non-volatile memory may store factory settings and user settings specific to the model.

In certain embodiments, the system may also include a cloud-based network. Factory settings, the user settings and the sensor data may be stored in the memory of the cloud-based network. The cloud-based network processor may be configured to determine set-up specific settings for a specific towing set-up of tow vehicle, trailer and all associated tow equipment, and transmit the set-up specific settings to the system based on the sensor data, the factory settings, and the user settings.

In another embodiment, the data input device may include a cell phone, satellite phone, smartphone, personal digital assistant, tablet computer, laptop computer, remote control device, mobile transmitter, a mobile internet device or a combination of one or more of the same.

In an embodiment, the sensors may convert sensor data to an electrical signal. The sensors may include at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In one embodiment, the system may also monitor, via the sensors, behavior of a vehicle and its components while driving on a specific trip. Adjustments to the model for the specific trip based on the specific trip sensor data and input data may then be made. An adjusted model based on the adjustments may then be stored in the non-volatile memory.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Trailer Length Determination (TLD) automatically senses the length of a trailer, from the pivot point to the axle. The length of the trailer is then communicated to the driver of the vehicle or to the control system of an autonomous vehicle so that the trailer may be properly towed both forward and backwards.

Driving a vehicle with a trailer can be difficult. For example, trailers track differently than a tow vehicle, so tow vehicles must turn wide to keep the trailer from driving outside their lane over curbs, etc. Driving in reverse is especially difficult, as the trailer can articulate so much that the trailer collides with the tow vehicle (jack knife).

The act of backing up a vehicle with an attached trailer can be a challenging maneuver even for individuals with considerable driving experience. Such maneuvers often require counterintuitive inputs, making them error-prone, cumbersome, frustrating, and dangerous, especially for inexperienced drivers. A common mistake when backing up a vehicle and trailer is to "jack knife" or "bind" the vehicle and trailer during the reverse motion. When this occurs, the driver is prevented from being able to steer the vehicle and trailer any further along its desired path. Backup maneuvers are particularly difficult with long wheelbase dual-axle trailers (as compared to single axle trailers), thus leaving the driver even more prone to jack knifing or binding.

The length of the trailer influences the process of backing up. Short trailers are more sensitive to changes in the angle or pitch of the trailer with respect to the tow vehicle, and can jack knife very quickly if care is not taken to make necessary adjustments while steering the vehicle.

In addition to potential problems while backing up a trailer, even the forward motion of a vehicle towing a trailer may present possible hazards. Towing a trailer of unknown length and weight may cause a condition known as off-tracking. Due to their size and weight, vehicles pulling trailers are challenging to operate safely in traffic. Off-tracking may cause drivers of a vehicle towing a trailer difficulty in negotiating turns. Off-tracking is when the rear wheels of the trailer travel in a different path around turns and curves than the front wheels do, an effect that frequently results in accidents. Because this is a known effect, truck wreck attorneys maintain that it is the truck driver's responsibility to prevent accidents through careful driving and negotiation of turns.

Off-tracking is when a Longer Combination Vehicle (LCV) like a tractor trailer makes a turn or negotiates a ramp, and the rear wheels of the trailer end up driving in a different path than the tractor and the front wheels of the trailer. This happens in conditions where there is not enough space for the driver to make a wide turn that prevents off-tracking, such as turning on city streets or tight highway on ramp curves. Trailers that off-track usually run over curbs when turning to the right and invade oncoming traffic lanes when turning to the left. Also, in these tighter situations, the longer the trailer, or combination of trailers, the greater the amount of off-tracking.

Off-tracking is a common cause of accidents that range from minor to severe. The usual way that these occurrences happen is when trucks end up driving into other vehicles in their path, or sometimes even unsuspecting pedestrians. At slow speeds such as negotiating city streets this effect is known to cause many fender-bender type accidents, but when off-tracking happens at higher speeds, such as when negotiating a tight curve in the road or an on- or off-ramp, cars can be sideswiped by a truck's rear wheels, and a bigger, more dangerous accident can occur as a result.

Although it is impossible for truck drivers to avoid off-tracking in many situations, especially when negotiating tight city streets, there are specific, and safe ways in which off-tracking should be handled. Most importantly, drivers must drive slowly enough to carefully make their turns, stopping if it seems they will run into other vehicles, pedestrians or objects along the side of the road. It is the duty of the truck driver to yield to other traffic when it becomes obvious that the truck cannot make its turn without driving into the path of oncoming cars, or onto the sidewalk, and give those vehicles and people the chance to move out of the way. Careless driving and truck drivers who are moving too fast in close conditions are generally the cause of these kinds of accidents.

When trucks fail to stop, or drivers try to stop too late, they may end up hitting something or someone. Drivers of any vehicle, not just big trucks, who are in a hurry tend to make poor judgment decisions, such as those that lead to off-tracking accidents. For this reason, most off-tracking accidents are found to be the fault of truck drivers.

The important idea here is that while off-tracking may not be avoidable in some instances, especially with longer trucks, or multi-trailer LCVs, knowing the appropriate way to deal with it is essential. When truck drivers are careless, tractor trailer accidents caused by off-tracking happen and people are injured.

In order to properly maneuver a trailer being towed, it is important to know the length of the trailer. Determining the limits for hitch angle (position of trailer with respect to the tow vehicle) is necessary to determine the extent of off-tracking, and to prevent jack knifing.

The length of the trailer must be known in order to properly determine allowable hitch angles. Jackknifing during backing up of trailers occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time and can potentially cause damage or personal injury. The TLD determines trailer length, and in certain embodiments may also analytically determine the 'critical hitch angle' (Ocr), the hitch angle threshold beyond which a continued reverse motion causes an inescapable jackknifing.

The TLD may also, in other embodiments, provide a formal definition of Ocr for slow backing up of vehicle-trailer systems on a level solid surface, beyond which the vehicle must stop backing up and revert to forward motion in order to escape from jackknifing. The critical hitch angle is sub-categorised into Absolute (Ocr, a) and Directional (Ocr, d) critical hitch angles depending on the operating constraints and vehicle steering objectives. One solution for Ocr is posed as a numerical solution to the steady-state conditions of the dynamic equations. Also, a warning system making use of the Ocr may also be implemented in an embodiment of the TLD. Such warning system may assist drivers in avoiding jackknifing while backing up a vehicle-trailer system. In other embodiments the Absolute (Ocr, a) and Directional (Ocr, d) critical hitch angles may be provided to a semi-autonomous control system or autonomous control system in order to inform the operation of the tow vehicle.

The objectives of the Trailer Length Determination (TLD) are to determine the length of a trailer being towed by a vehicle. The TLD further enables adjustments to a vehicle's control settings to be made based on the length of the trailer weight. The TLD informs the control system of an autonomous vehicle, or the driver of a semi-autonomous vehicle regarding trailer length in order to allow better control while going forward (off-tracking) and while backing up (avoid jack knifing).

The TLD utilizes on-board sensors and equipment to determine trailer length. This length data is communicated to the driver and the control system of an autonomous vehicle. This data along with vehicle and trailer weight data is communicated to the processors or on-board computers that control the operation of the vehicle and systems related to towing a trailer. Information regarding trailer length and weight is communicated in real-time, enabling real-time adjustments to be made to the vehicle and towing systems based on this data.

The TLD consists of software and/or firmware and other equipment or systems that enable the hardware and systems in a vehicle to make adjustments to emissions control settings and other control systems within the vehicle.

The TLD may include one or more of the following components:
1. Software
2. Firmware
3. Hardware
4. Sensors—electrical, electro-mechanical, automotive, chemical, navigational, thermal 5. Magnetometer, gyro's, motion sensor, radar, lidar, proximity sensor, camera
6. Accelerometers
7. Processor
8. Controller or microcontroller
9. Memory or other data storage device or module
10. Wireless network device
11. Mobile device The basic process of how the TLD is used or implemented is as follows: A user opens the TLD app on a mobile device (or app "on-board" vehicle for OEM implementation) that prompts the user to indicate equipment included in the system. If the equipment included is a trailer, for example, the user is prompted to indicate that the trailer is part of the system and to include the trailer and its weight. In some embodiments, the trailer and its weight are recognized by the TLD automatically so that no user interface is required. In other embodiments, the TLD is automatically started every time the vehicle is driven and communicates to the vehicle control system the weight of the loads (both loads in the bed of a truck, for example along with the trailer weight). In certain embodiments, the TLD includes sensors that recognize when equipment like a trailer is connected to the truck, and starts tracking the weight of the trailer as soon as it is hooked up.

Information regarding trailer length and weight is communicated in real-time, enabling real-time adjustments to be made to the vehicle systems to accommodate any changes. These adjustments may be made initially when the driver first starts driving the vehicle based on pre-set data, or measured data made prior to a first drive event with load (weight). As the vehicle begins a first drive event, the TLD may monitor the trailer length and weight and make further adjustments to the length and weight data based on the behavior of the system while towing.

In some embodiments, a custom load profile may be developed by building a profile for each trailer or loading characteristic. For example, there may be a load profile called "trailer A" which comprises a load profile for the truck pulling a trailer. Since each case may require different settings for the control system, or other related systems based on the length of the trailer and amount of weight or load, a unique profile may be stored in memory and used in the future for that same application. In this way, the "trailer A" profile may then be engaged every time the trailer is hooked up.

Feedback from adjustments made to various on-board control systems may be further detected by the TLD in order to further refine and calibrate the settings and profiles. These profiles are stored in the memory of the TLD and used to determine the appropriate settings for subsequent trips. Every time the vehicle is driving on the roadway, on-board sensors including trailer length detection, weight detection systems and accelerometers continue to provide data to inform the TLD regarding the behavior of the vehicle under the present conditions.

The TLD automatically senses the length of the trailer, from the pivot point to the axle. The angle of the trailer with respect to the tow vehicle is measured via:

Rear view camera perception of the trailer vs. the road moving below. Ultra-sonic sensors sensing distance to trailer, and therefore angle of trailer to tow vehicle. Radar, lidar, and other sensors to detect angle. Magnetometer, gyro's, and other sensors that detect motion and weight of the vehicle and trailer may also be employed.

By monitoring the trailers angular movement with respect to the tow vehicle, the distance from the pivot to the axle may be learned. This may occur by only observing the front of the trailer.

Tractrix involute curves are utilized to describe the motion of the tow vehicle and trailer. Regression is used to solve for the distance from the pivot to the axle. Once this is known, the off tracking may be calculated for various curves. Inputs into the function would include: Steering wheel angle sensor, wheel speed sensors, tow vehicle to angle sensing (camera, Infrared, Lidar, Radar, Ultrasonics, Gyro, Magnetometers, etc.)

Features unique to the TLD include the ability to determine trailer length while the vehicle is in motion. While the tow vehicle is moving either in a forward or reverse direction, the TLD continuously monitors and reports trailer length. In this way, refinements to the length measurements may be made to confirm the actual length.

The length from the pivot to the axle may be stored for future trips, and the trailer/vehicle combination may be reported by the TLD to the driver and autonomous control system when it is first set-up. Over a series of trips made with a specific set-up (tow vehicle with trailer), the TLD may build a profile of how this set-up behaves under various conditions. For example, the trailer length and weight may be recorded for each trip in order to determine how a trailer of a certain length behaves on specific road conditions. Previously recorded info regarding this behavior may be used to predict future behavior. For heavier loads, the off-tracking may be amplified—so the model (based on the profile) may predict more slipping (increased off-tracking) of the vehicle or trailer at certain speeds. The TLD may suggest that the driver (via audible and/or visual alerts), make adjustments to the speed or steering to accommodate these conditions. The TLD may also report this info to the control system of an autonomous vehicle. In some embodiments, this may be done in real time and proactively—anticipating the required adjustments and recording the effect of these adjustments. Sensors may record the result of each adjustment and add this data to the profile for that specific set-up under those specific conditions. As the sensor data is reported, the TLD may also make immediate adjustments that may influence the off-tracking in real-time.

In certain embodiments, the TLD may also have sensors that record road conditions, weather conditions, and other factors outside of the vehicle & trailer (for example traffic conditions reported from the cloud connection regarding other vehicle on the roadway) that may impact the immediate control of the vehicle. This data may be also recorded in a profile for each specific trip.

The TLD may also include a hub for the broader internet of towing. The TLD may communicate with fleet management systems, other vehicles, and other products on board the vehicle and on the trailer.

In certain embodiments, the TLD may be implemented directly into the vehicle in a factory or OEM application. In other embodiments, the TLD may be retrofitted to an existing vehicle. In a retrofit application, the TLD may plug into the vehicle's OBD port to allow interface with the vehicle's control system. Alternatively, it may be connected wirelessly either via a wireless adapter to the OBD, or to other wireless interface devices that connect the TLD to the vehicle's control systems.

The TLD may also interface with autonomous or semi-autonomous vehicles, informing the control system regarding weight and the impact that weight has on the engine and emissions system.

In certain embodiments, the TLD may be implemented via a local network. The local network may comprise the engine, emissions system and all associated control systems that affect emissions. The TLD may communicate weight and engine loading data to each of these systems. In certain embodiments, the TLD may develop performance profiles based on adjustments made based on weight and engine loading. The TLD may further monitor the performance of these systems based on the performance profile in order to calibrate and refine the settings.

In other embodiments, the TLD may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the TLD may also be done via the cloud.

A mobile device may also be used for a user interface with the TLD. In some cases, the processor in a mobile device along with other TLD components may be comprised within the mobile device, and the mobile device may interface with the vehicle via a wireless connection. The mobile device may allow for user data or changes to the factory presets to be entered in.

In another embodiment, the user interface with the TLD may be via the vehicle's infotainment system or other interface device on the dashboard of the vehicle.

FIGURES

Figure 1A:
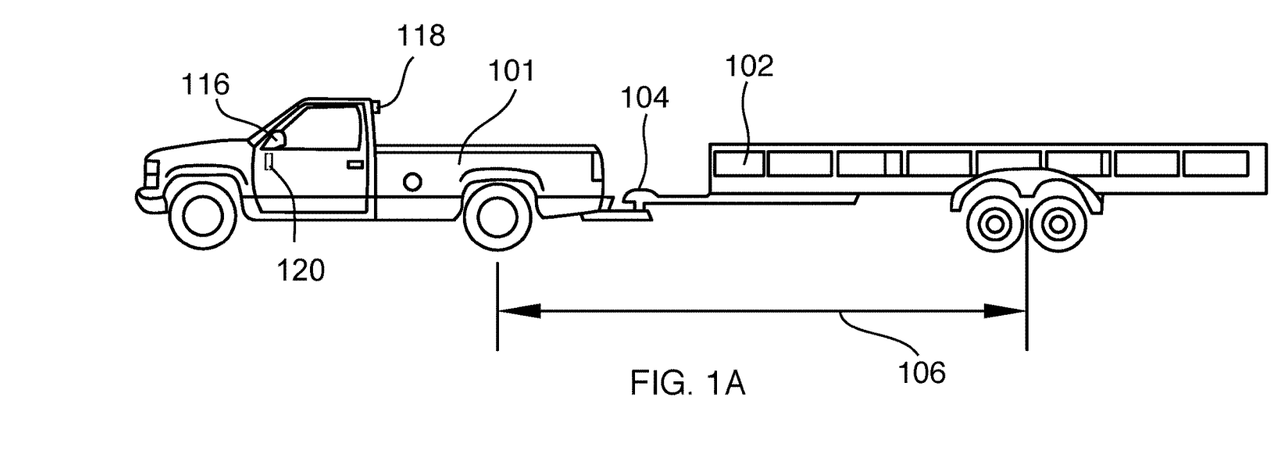
FIG. 1A is an illustration depicting a truck pulling a flat-bed trailer.

FIG. 1A is an illustration depicting one scenario demonstrating how the trailer path optimization system 120 may be implemented for a specific truck pulling a flatbed trailer. Truck 101 is shown hauling flatbed trailer 102. Image sensor 118 on the back of truck 101, and image sensor 116 on the rear-view mirror are aimed towards the trailer 102 in order to collect data regarding the trailer path. The length 106 of Flatbed trailer 102 is different than the length 108 of camp trailer 110 shown in FIG. 1B, so the system 120 determines the specific behavior of the flatbed trailer 102 based on its length 106.

Figure 1B:
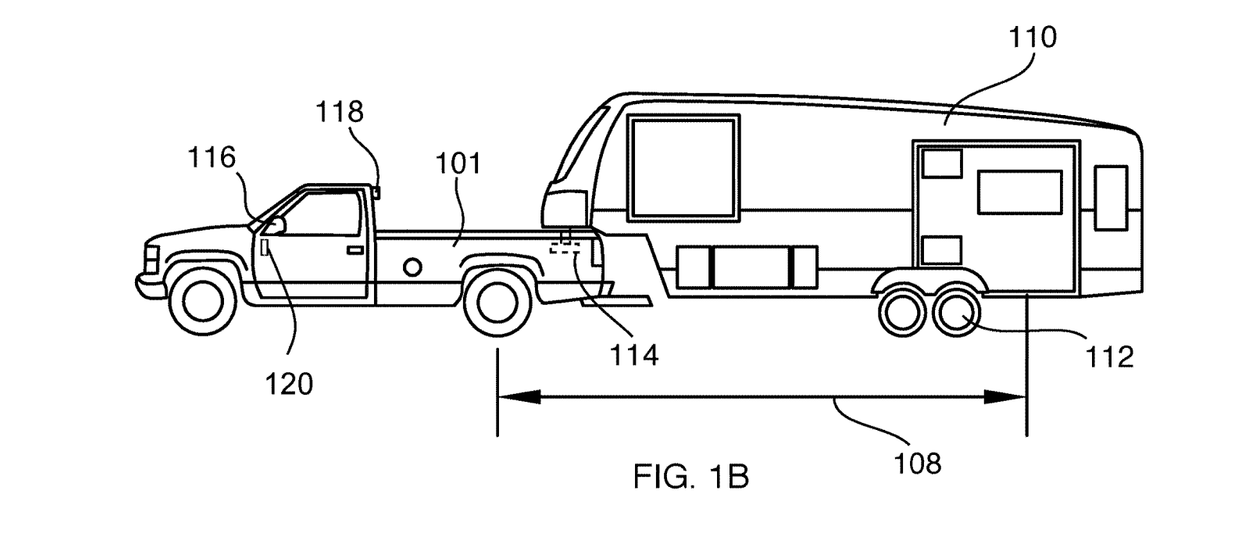
FIG. 1B is an illustration depicting a truck pulling a camp trailer.

FIG. 1B is an illustration depicting one scenario demonstrating how the trailer path optimization system 120 may be implemented for a specific truck pulling a camp trailer. Truck 101 is shown hauling camp trailer 110. Image sensor 118 on the back of truck 101, and image sensor 116 on the rear-view mirror are aimed towards the trailer 102 in order to collect data regarding the trailer path. The length 108 of camp trailer 110 determines the specific behavior of the camp trailer 110.

Figure 1C:
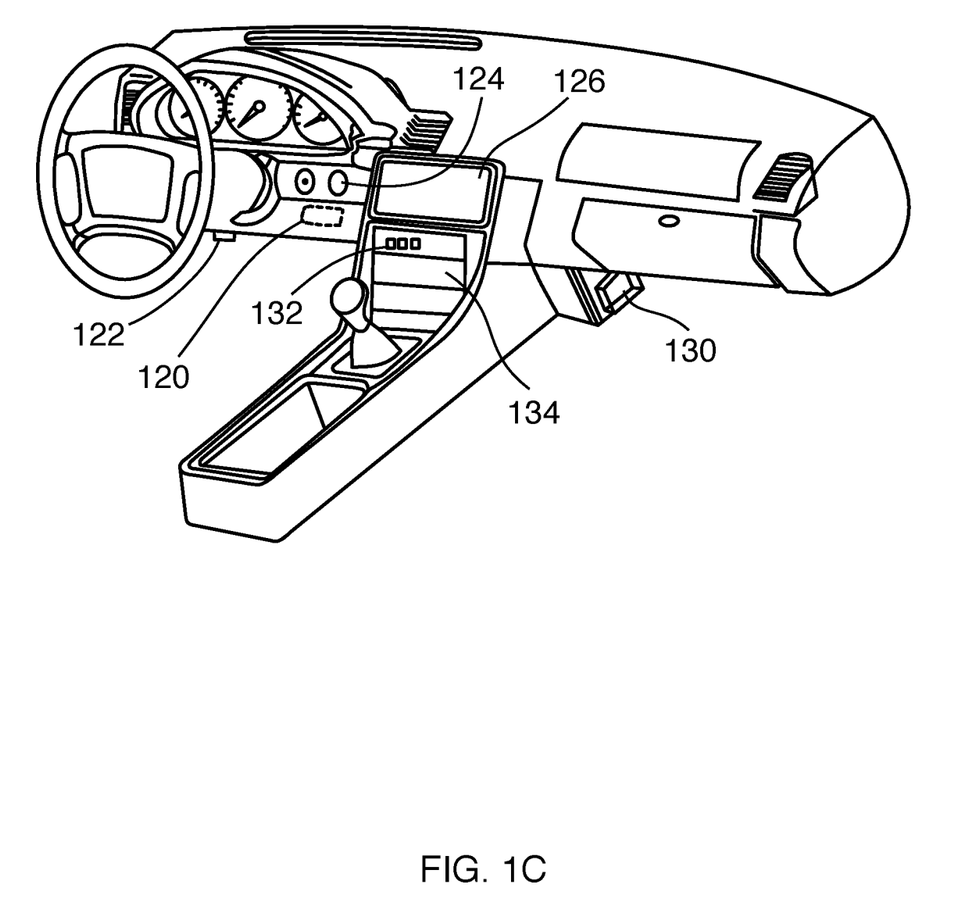
FIG. 1C is an illustration depicting a car dashboard, steering wheel and shifter.

FIG. 1C is an illustration depicting a car dashboard, steering wheel and shifter. The trailer path optimization system 120 is shown behind the dashboard near the steering wheel. In some embodiments, the system 120 is an OEM product incorporated into the vehicle at the time of manufacture. In other embodiments, the system 120 may be connected to the vehicle via the OBD port 122 as an after-market component. In one embodiment, the OBD connector may have a wireless connection to the system. In another embodiment, the system may be plugged into the OBD port 122 with a wired connector.

In another embodiment, an after-market wireless device 130 may be attached to the vehicle. The vehicle may have a tow/haul button 124 on the dash of the vehicle. Other user interface devices may include an infotainment system 134, vehicle control system user interface buttons 132, or user interface panel 126. The purpose of these interface devices is to provide one or more methods for the user or driver to input settings, or to communicate to the monitoring system. The interface devices also provide a way for the system to communicate a vehicle path condition and to alert the driver to changes in the vehicle path or additional conditions detected by the system that require user intervention.

For example, the driver or user may enter the details of a trip prior to engaging the system. Details may include the specifications for the trailer (length and width for example), along with other details relating to the travel path of the trailer. The system may then determine that the trailer is compatible with the tow vehicle. At this point, the driver may then connect the tow vehicle to a trailer. The system may also communicate the required trailer ratings or type needed for the identified trip. In some embodiments, the system may automatically recognize the trailer prior to connection to the tow vehicle and alert the driver prior to hooking it up. In this way, the system may proactively assist the driver in the initial towing set-up.

Figure 2A:
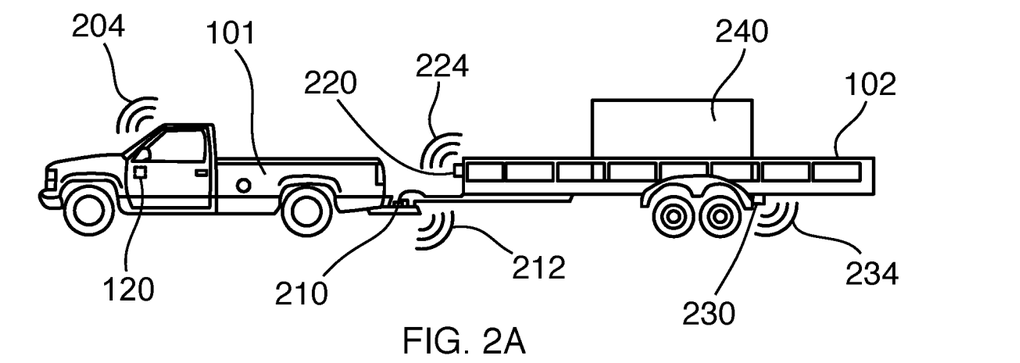
FIG. 2A is an illustration depicting a specific truck pulling a flatbed trailer.

FIG. 2A is an illustration depicting one scenario demonstrating how the monitoring system 120 may be implemented for a specific truck pulling a flatbed trailer 120. System 120 may communicate via wireless signal 204. Truck 101 is shown hauling flatbed trailer 102. Trailer path may be communicated by wireless device 220, and load 240 may be communicated to the system 120 via trailer wireless signal 224. Trailer hitch type and connection may be determined by sensor 210 and communicated via wireless signal 212. Friction, slippage or drift of the rear of the trailer 102 may be determined by sensor 230 and communicated via signal 234.

Figures 2B, 2C:
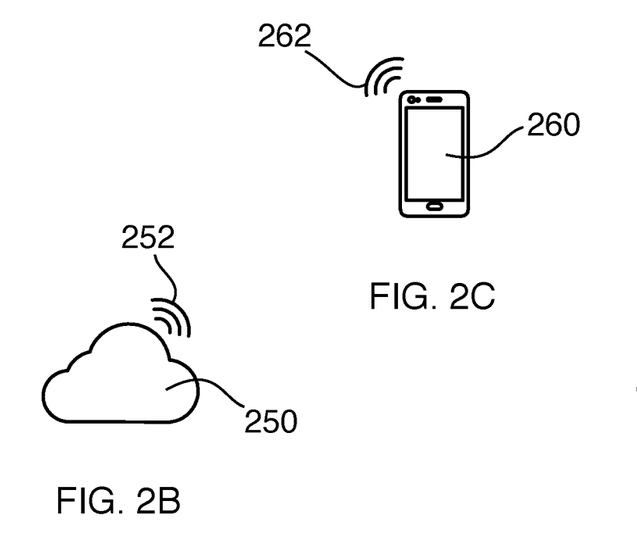
FIG. 2B shows a cloud network communicating via a wireless signal.
FIG. 2C illustrates a mobile app on a mobile device.

FIG. 2B shows a cloud 250 network communicating via wireless signal 252. The cloud may communicate to the system to store vehicle and trailer path data as a back-up for any memory loss to the vehicle mounted system components. System components may be redundantly included in the cloud, on the vehicle system component and on a mobile device. In this way, various system components that may be damaged or otherwise rendered inactive for any reason may be backed up by these redundant system components. For example, if a vehicle's computer or control system is damaged, a complete copy of all settings may be re-installed into a new replacement computer or control system. All relevant data and information including modeling for each set-up are communicated to the cloud 250. All settings, manufacturers ratings, set-ups and user input data may be stored in the cloud. In some embodiments, set-up information may be retained in the cloud 250 and downloaded to the system after a system failure, or data loss.

FIG. 2C illustrates a mobile app on the mobile device 260 shown. In this embodiment, the system is on the mobile device and all interface between the tow vehicle and trailer is done wirelessly via signal 262.

Figure 2D:
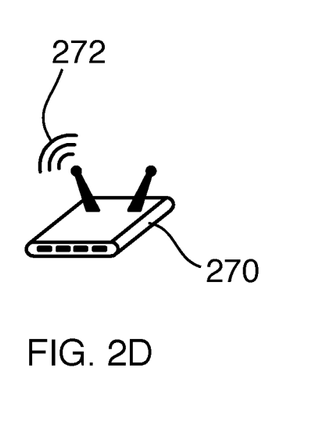
FIG. 2D is an illustration of a wireless hub.

FIG. 2D is an illustration of a wireless hub 270, which may function as a bridge or connecting device to a network. Wireless signal 272 may connect the hub 270 to the monitoring system.

Figure 3A:
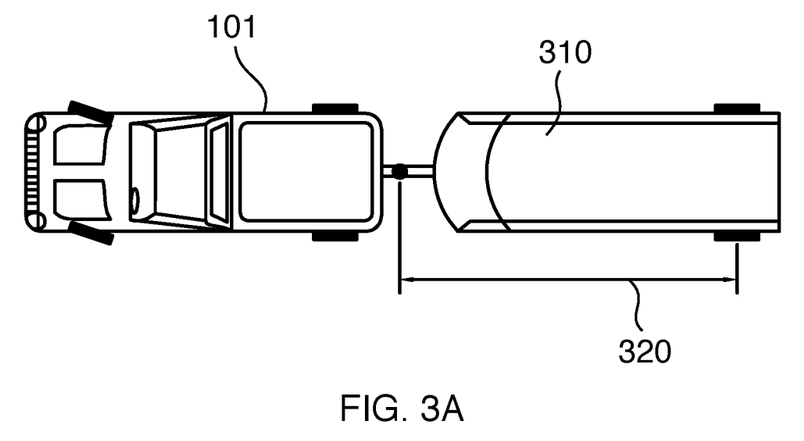
FIG. 3A is an overhead view of a truck and trailer.

FIG. 3A is an overhead view of a truck and trailer. Truck 101 is shown pulling trailer 310. Trailer length 320 is determined by the trailer path optimization system.

Figure 3B:
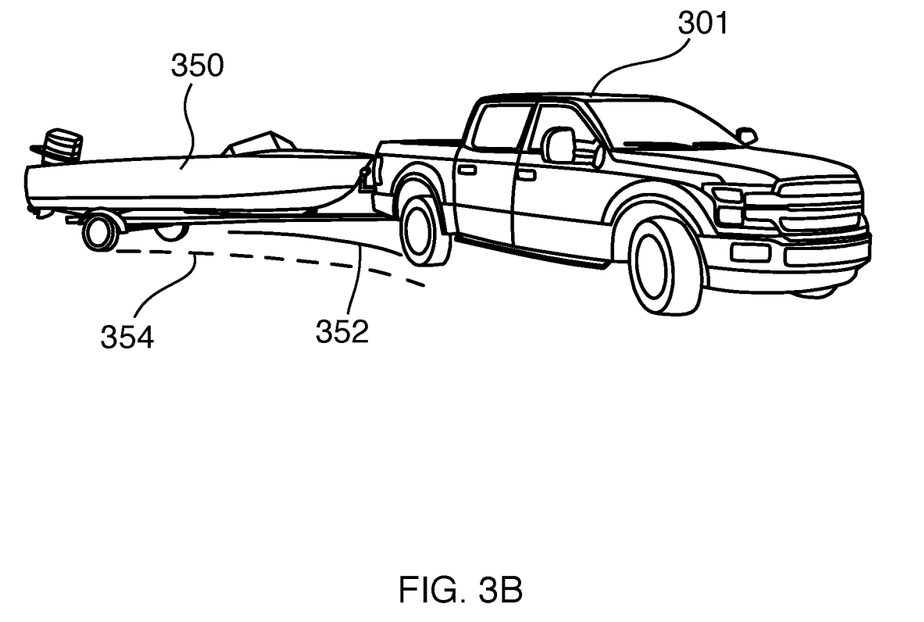
FIG. 3B is a perspective view of a truck pulling a boat trailer.

FIG. 3B is a perspective view of a truck pulling a boat trailer. Truck 301 follows along path 352 while turning a corner. Off-tracking 354 of the boat trailer 350 is shown. Since the off-tracking 354 may allow the trailer to come to close to an obstruction at the corner of the turn, the trailer path optimization system may alert the driver to make a wider turn as approaching the corner. Likewise, the system may alert the vehicle control system to make adjustments to the tow vehicle (take a wide approach to the turn) in order to prevent the boat trailer 350 from running into an obstruction at the corner.

Figure 4A:
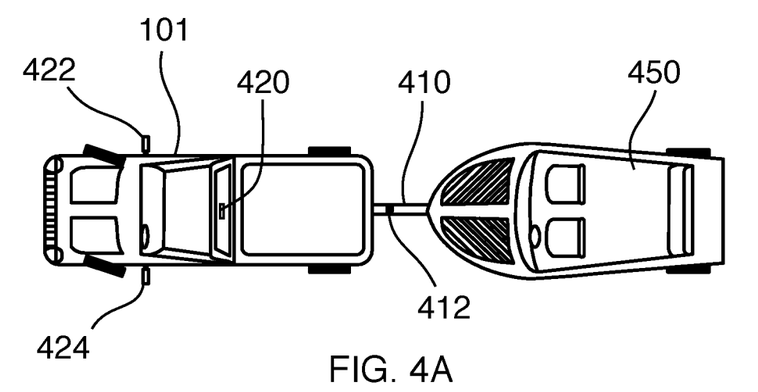
FIG. 4A is an overhead view of a truck towing a boat trailer.

FIG. 4A is an overhead view of a truck towing a boat trailer. Truck 101 is aligned with boat trailer 450 and connected at hitch pivot point 412. Image sensor 420, right image sensor 422 and left image sensor 424 collect data regarding the position of the boat trailer 450.

Figure 4B:
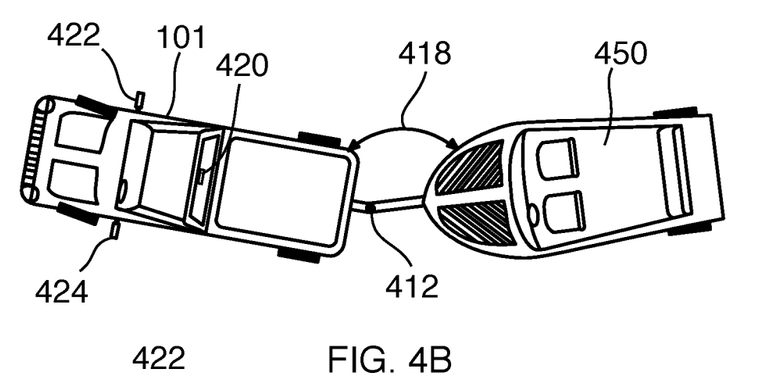
FIG. 4B is an overhead view of a truck beginning to turn while towing a boat trailer.

FIG. 4B is an overhead view of a truck beginning to turn while towing a boat trailer. Truck 101 is backing up with boat trailer 450 and is starting to turn at pivot point 412. The angle 418 between the truck 101 and boat trailer 450 decreases as the truck 101 is backing up. Image sensor 420, right image sensor 422 and left image sensor 424 collect data regarding the position of the boat trailer 450 along with the trailer path.

Figure 4C:
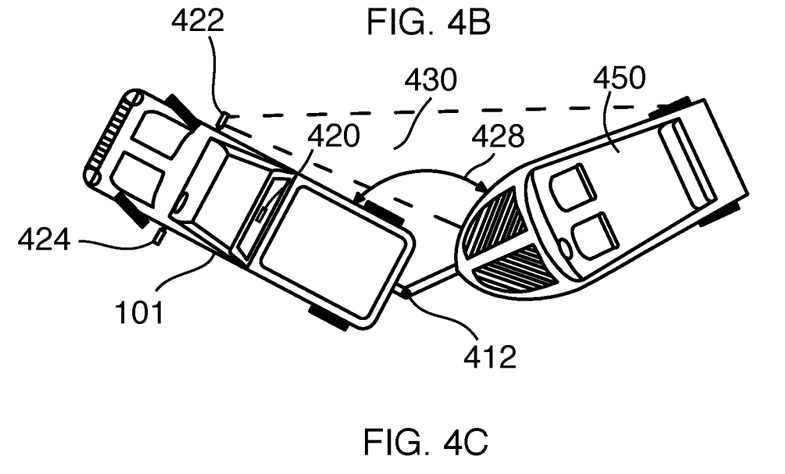
FIG. 4C is an overhead view of a truck in a tight turn while backing up a boat trailer.

FIG. 4C is an overhead view of a truck in a tight turn while backing up a boat trailer. Truck 101 is backing up boat trailer 450 and is turning at pivot point 412. The angle 428 between the truck 101 and boat trailer 450 is very tight and approaching a jack-knife position as the truck 101 is backing up. Image sensor 420, right image sensor 422 and left image sensor 424 collect data regarding the position of the boat trailer 450 along with the trailer path. Right image sensor 422 may have a wide view 430 of the trailer at this angle. The system may alert the driver or the autonomous control system that the truck 101 has approached the turning radius limit and must be adjusted to avoid jack-knifing.

Figure 5:
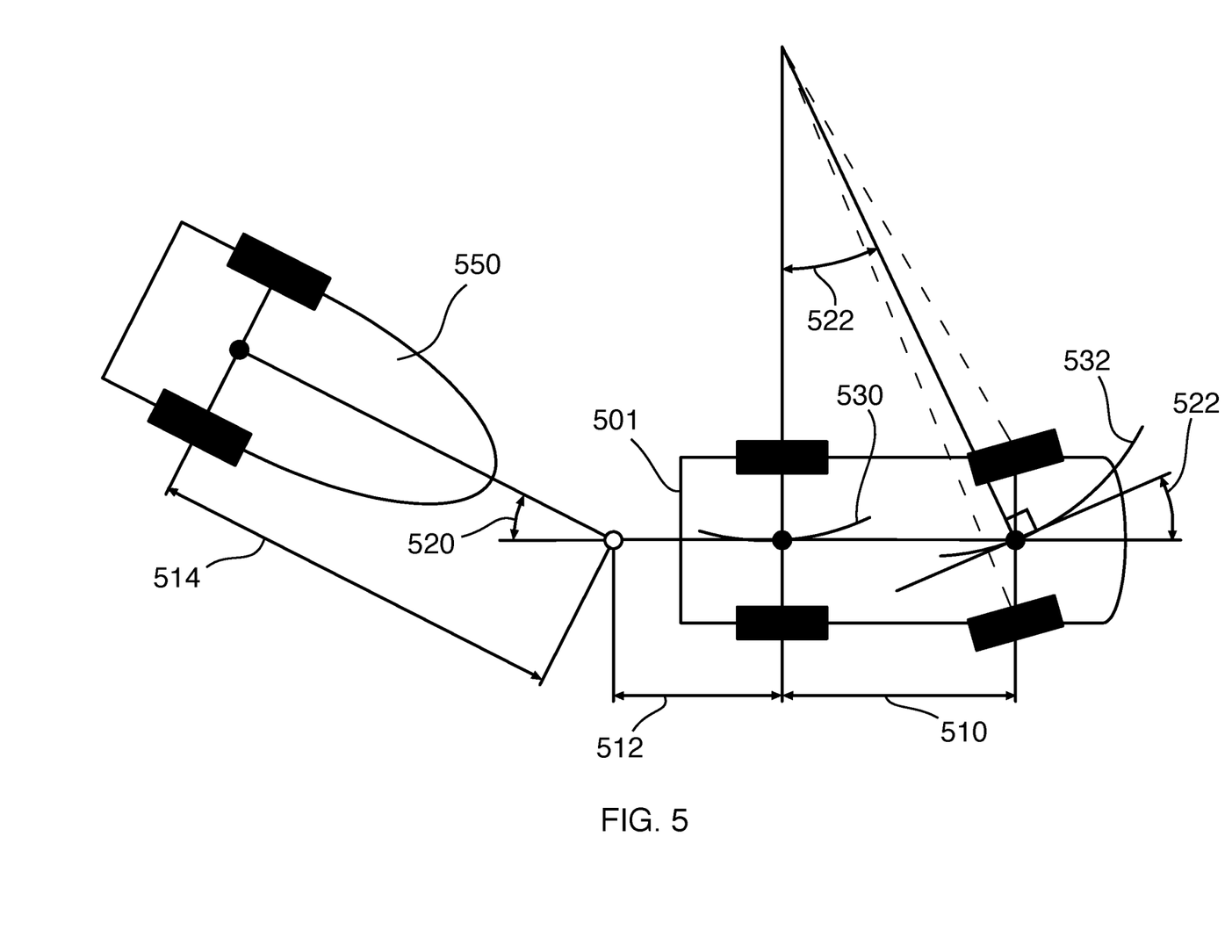
FIG. 5 is an illustration of a truck connected to a trailer showing geometry angles.

FIG. 5 is an illustration of a truck connected to a trailer with angles and geometry indicated. Truck 501 is connected to trailer 550.

Model geometry showing variables a, b, c, φ, θ, s, and r. The following variables are used:

510=a: The length from the midpoint of the front (turning) axle to the midpoint of the rear axle.

512=b: The length from the midpoint of the rear axle to the trailer hitch pivot.

522 c: The length from the trailer hitch pivot to the midpoint of the trailer axle.

522=φ: The instantaneous angle, in radians, between the centerline of the towing vehicle and the direction of travel of the midpoint of its front axle.

520=θ: The instantaneous angle at the trailer hitch, in radians.

532=s: Integrated arc length measured from the midpoint of the front axle. 530=r: Integrated arc length measured from the midpoint of the rear axle. This is related to s by the conversion:

$$\frac{dr}{ds} = \cos\phi.$$

The angle φ can also be measured from the center point of the turning radius circle as the angle between the line that passes through the center point and the rear axle and the line that passes through the center point and the midpoint of the front axle.

The angle θ is defined in such a way that it is 0 when the trailer is straight.

The convention pictured is that both angles are positive during a left turn, but the equations are the same so long as the same sign is used for both angles.

The quantity of interest is the rate of change of the angle θ, either with respect to the total motion of the front axle midpoint, namely dθ/ds, or with respect to the forward motion of the rear axle midpoint, namely dθ/dr.

The equations:
Given these variables, the rate of change of the angle at the trailer hitch is given by the formula:

$$\frac{d\theta}{ds} = \frac{1}{c}\cos\phi\sin\theta + \frac{b}{ac}\sin\phi\cos\theta + \frac{1}{a}\sin\phi$$

or by the formula:

$$\frac{d\theta}{dr} = \frac{1}{c}\sin\theta + \frac{b}{ac}\tan\phi\cos\theta + \frac{1}{a}\tan\phi.$$

Either derivative has units of inverse length (radians per distance traveled), where the length unit matches the unit in which a, b, and c are expressed.

Under conditions that make the correct denominators non-zero (for example, during a turn), it is possible to solve for the trailer length c if one has a measurement of either angle derivative:

$$c = \frac{a\cos\phi\sin\theta + b\sin\phi\cos\theta}{a\,d\theta/ds - \sin\phi}$$
$$= \frac{a\sin\theta + b\tan\phi\cos\theta}{a\,d\theta/dr - \tan\phi}.$$

Figure 6:
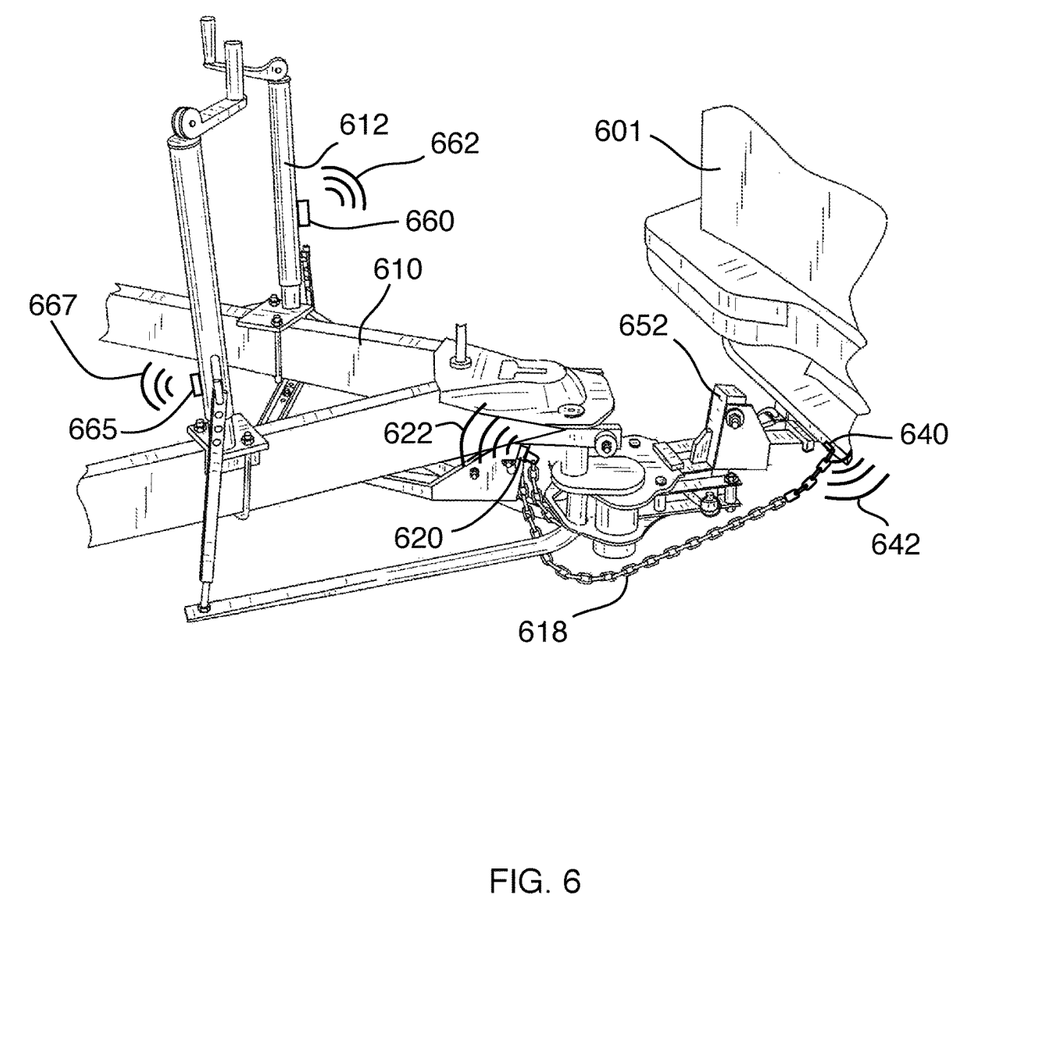
FIG. 6 is an illustration of a trailer hitch connected to the back of a truck.

FIG. 6 is an illustration of a trailer hitch connected to the back of a truck 601. Truck 601 has a receiver hitch 652 which is connected to trailer 610. In this embodiment, the receiver hitch 652 has a wireless device 640 for communication of data to the system. The trailer 610 also has a wireless transmission device 620. The system may automatically request notification from wireless device 440 via wireless signal 642, and wireless device 620 via wireless signal 622 as the trailer 610 is hooked up. In some embodiments, device 640 may also include a sensor indicating that the chains 618 have been connected. The data informing the system may also include this chain connection data to assure that the safety chains 618 are in place before driving off. In a similar manner, jacks 612 may include sensors 660 and 665 that transmit signals 662 and 667 to the system alerting the system that the jacks are fully seated and in the correct position. In certain embodiments, jacks 612 and 613 may adjust anti-sway or stabilizer bars. The proper settings for this equipment may be communicated to the system. Any deviations from the correct set-up may be communicated to the user and to a monitoring station. The user may then have the option to make adjustments to the set-up to bring it into compliance with the recommended settings and equipment ratings before operating the vehicle.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for optimizing a trailer path, comprising:
at least one image sensor configured to capture images of a trailer attached to a tow vehicle;
one or more accelerometers that sense acceleration of at least one of the tow vehicle and the trailer;
a data input device configured to receive input data;
a processing device comprising a processor and non-volatile memory;
wherein the processor is configured to:
receive image data from the image sensor;
receive accelerometer data from the one or more accelerometers;
receive input data from the data input device;
determine a trailer path based on the image data, accelerometer data, and the input data;
build a model of a set-up for a specific tow vehicle connected to a specific trailer;
wherein the model is based on a specific load and performance profile;
wherein the model determines at least one mode based on the data associated with the set-up for the model;
wherein the model is stored in the non-volatile memory; wherein the system receives user settings;
wherein the system communicates the settings for the model to the vehicle control system;
wherein the system alerts the user to the settings for the model;
communicate the trailer path to a user or vehicle control system, thereby prompting adjustments to the tow vehicle path and or acceleration when the trailer path is not optimum.

2. The system of claim 1, wherein tractrix involute curves are utilized to predict behavior data for the tow vehicle attached to the trailer, wherein the behavior data comprises data describing motion of the tow vehicle; motion of the trailer; motion of the trailer with respect to the tow vehicle; trailer path and vehicle path.

3. The system of claim 2, wherein the processor is configured to predict a future vehicle path and a future trailer path based on the behavior data.

4. The system of claim 2, wherein the processor determines length and width of the trailer.

5. The system of claim 1, wherein the input device further comprises: one or more sensors; wherein the one or more sensors produce sensor data.

6. The system of claim 5, wherein the sensors convert sensor data to an electrical signal; and wherein the sensors comprise at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

7. The system of claim 1, wherein the image sensors are mounted on the back of the tow vehicle, on the sides of the tow vehicle, and/or on the rear-view mirrors of the tow vehicle.

8. The system of claim 1, wherein the system further comprises a monitoring device that communicates the image data, the accelerometer data, and the input data to a monitoring system.

9. The system of claim 8, wherein the monitoring device communicates the image data, the accelerometer data, and the input data to the vehicle control system.

10. The system of claim 1, wherein the system sends at least one control command to the vehicle control system, controlling the operation of a tow vehicle based on the determined vehicle path.

11. The system of claim 1, wherein the system sends at least one control command to a hybrid vehicle control system, controlling the operation of a hybrid tow vehicle's electric motor and internal combustion engine based on the determined vehicle path.

12. The system of claim 1, wherein the input device is an OBD device connected by a plug-in connector to a vehicle OBD port.

13. The system of claim 1, wherein the system sends at least one control command to a vehicle computer server.

14. The system of claim 1, wherein the input device receives and transmits data via a wireless interface.

15. The system of claim 14, wherein the wireless interface utilizes a protocol of at least one of a Bluetooth, Bluetooth mesh, WIFI, NFC, RFID, BLE, ZigBee, Z-wave, LoRaWAN, Dash7, DigiMesh, ANT, ANT+, NB-loT, 3G, 4G, 5G, LTE or combinations thereof.

16. The system of claim 1, wherein the non-volatile memory stores factory settings and user settings specific to the model.

17. The system of claim 1, wherein the system further comprises a cloud-based network;
wherein factory settings, the user settings and the sensor data are stored in the memory of the cloud-based network;
wherein the cloud-based network processor is configured to: determine set-up specific settings for a specific towing set-up of tow vehicle, trailer and all associated tow equipment; and
transmit the set-up specific settings to the system based on the sensor data, the factory settings, and the user settings.

18. The system of claim 1, wherein the data input device comprises a cell phone, satellite phone, smartphone, personal digital assistant, tablet computer, laptop computer, remote control device, mobile transmitter, a mobile internet device or a combination of one or more of the same.

19. The system of claim 1, wherein the system further:
monitors, via the sensors, behavior of a vehicle and its components while driving on a specific trip;
makes adjustments to the model for the specific trip based on the specific trip sensor data and input data; and
stores, in the non-volatile memory, an adjusted model based on the adjustments.

* * * * *